(12) United States Patent
Wisnefsky et al.

(10) Patent No.: US 9,062,231 B2
(45) Date of Patent: Jun. 23, 2015

(54) WATER-RESISTANT ANTI-SLIP ARTICLES

(71) Applicants: Eric Wisnefsky, Southbury, CT (US); Christopher Andrew Keeler, Prospect, CT (US)

(72) Inventors: Eric Wisnefsky, Southbury, CT (US); Christopher Andrew Keeler, Prospect, CT (US)

(73) Assignee: Sticky Steps LLC, Southbury, CT (US)

( * ) Notice: Subject to any disclaimer, the term of this patent is extended or adjusted under 35 U.S.C. 154(b) by 162 days.

(21) Appl. No.: 13/924,514

(22) Filed: Jun. 21, 2013

(65) Prior Publication Data
US 2014/0377493 A1  Dec. 25, 2014

(51) Int. Cl.
| B29C 65/48 | (2006.01) |
| B32B 37/12 | (2006.01) |
| B32B 37/14 | (2006.01) |
| B32B 38/10 | (2006.01) |
| C09J 7/02 | (2006.01) |
| B32B 37/26 | (2006.01) |

(52) U.S. Cl.
CPC .............. *C09J 7/0278* (2013.01); *B32B 37/26* (2013.01); *Y10T 428/1476* (2015.01); *C09J 2433/00* (2013.01)

(58) Field of Classification Search
CPC ....... C09J 7/0278; C09J 2433/00; B32B 7/06; B32B 27/00; B32B 27/08; B32B 37/12; B32B 37/26; Y10T 428/1476; G09F 3/10
USPC ................................. 156/247, 249
See application file for complete search history.

(56) References Cited

U.S. PATENT DOCUMENTS

| 3,547,674 | A | 12/1970 | Draper et al. |
| 3,575,780 | A | 4/1971 | Trieschmann et al. |
| 3,676,198 | A | 7/1972 | McGroarty et al. |
| 3,745,034 | A | 7/1973 | Smith et al. |
| 3,895,153 | A * | 7/1975 | Johnston et al. ............. 428/141 |
| 4,243,696 | A | 1/1981 | Toth |
| 4,336,293 | A | 6/1982 | Eiden |
| 4,693,507 | A | 9/1987 | Dresen et al. |
| 4,745,139 | A | 5/1988 | Haasl et al. |
| 5,468,031 | A | 11/1995 | Holmgren |
| 5,494,729 | A | 2/1996 | Henry et al. |
| 5,645,912 | A | 7/1997 | Nelson et al. |
| 6,509,084 | B2 | 1/2003 | Sturtevant et al. |
| 7,125,599 | B2 | 10/2006 | Saldarelli et al. |
| 7,625,625 | B2 * | 12/2009 | Rios et al. ...................... 428/141 |
| 7,887,900 | B2 * | 2/2011 | DiPede ......................... 428/147 |

FOREIGN PATENT DOCUMENTS

JP   61297122 A  * 12/1986  ............. B29C 63/02

OTHER PUBLICATIONS

English Abstract of JP 61-297122 (Mar. 10, 2015).*

(Continued)

*Primary Examiner* — Sing P Chan
(74) *Attorney, Agent, or Firm* — Dilworth IP LLC

(57) ABSTRACT

A process comprising removing an adhesive-protecting film layer from a peel and stick multilayer article comprising an embossed, anti-slip thermoplastic layer selected from polyvinyl chloride, polypropylene, acrylonitrile butadiene styrene, polycarbonates or high density polyethylene; a water-resistant adhesive layer; and the adhesive-protecting film layer, thereby exposing one side of the water-resistant adhesive layer; and then applying the exposed side of the water-resistant adhesive layer to a surface that is at least partially covered with water.

8 Claims, 2 Drawing Sheets

(56) References Cited

OTHER PUBLICATIONS

Commerical Paper "Steps Matter", 3M Building and Commercial Services Division, 2011, p. 1-12.

Commercial Paper "3M Safety-Walk Slip Resistant Tapes and Treads", 3M Building and Commercial Services Division, 2011, p. 1-4.

Commerical Paper "Safety-walk Slip-Resistant Materials Technical Data", 3M Commercial Care Division, Dec. 2002, p. 1-8.

* cited by examiner

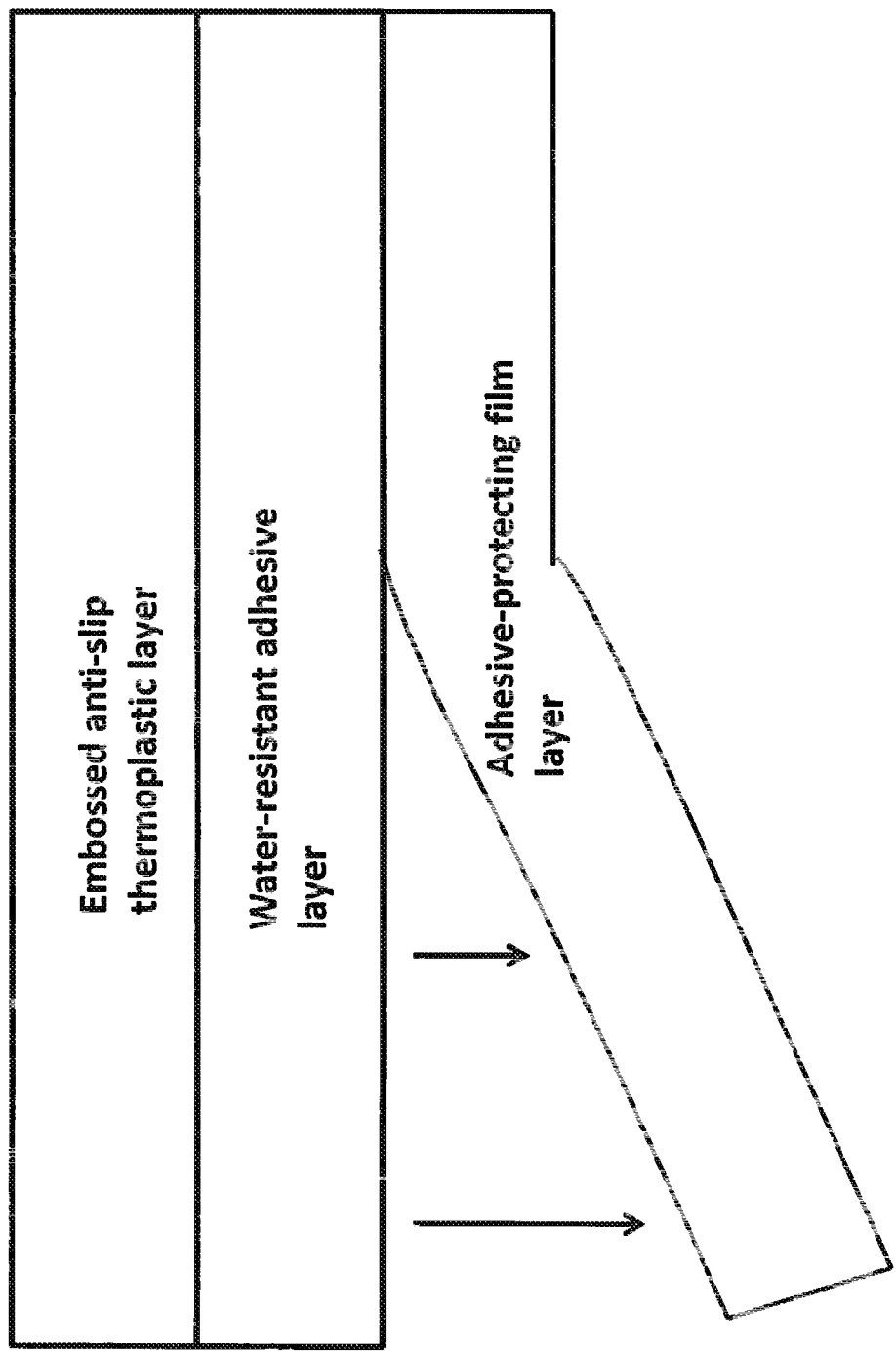

WATER-RESISTANT ANTI-SLIP ARTICLES

FIELD OF THE INVENTION

The invention relates to water-resistant anti-slip articles and a process for applying the articles to a surface. More particularly, the invention relates to a process for applying the water-resistant anti-slip articles to surfaces that are at least partially covered with water.

BACKGROUND OF THE INVENTION

Consumers looking to purchase a pool enjoy a wide variety of choices in construction materials. These materials offer various advantages and disadvantages with regard to initial and lifetime costs, availability in terms of shape and size, maintenance requirements and installation time. However, regardless of whether the pool is constructed from polyvinyl chloride, reinforced polyester, granite, or concrete, they all have slippery surfaces when wet. This is a common concern in the normal course of pool usage but can become especially problematic when pool pH values vary, or the chemical balance of the pool otherwise becomes unbalanced, allowing algae to grow. The presence of algae increases the slipperiness of the pool surfaces and creates a possibly dangerous situation for swimmers as they move across step surfaces within the pool or the pool bottom. Similar concerns exist with regard to wet surfaces in and around spas, showers, bathtubs and boats.

While conventional slip-resistant materials, such as treads, are generally available to reduce the slipperiness of surfaces, they are not typically suitable for pools in that they often contain large abrasive particles that could injure a swimmer's bare feet, and in any event are designed for installation under dry conditions. Further, while various products can be used to increase the coefficient of friction for a pool surface, none of these can be applied after the pool has been filled with water. Removing water from the pool is possible, however, it is costly, time consuming, and in the case of a pool having a polyvinyl chloride liner, may even compromise the structural integrity of the liner in the pool if not done properly by a professional. Therefore, work has been ongoing to produce articles having improved anti-slip properties that can be used on surfaces partially or totally covered by water, such as pools.

U.S. Pat. No. 6,509,084 discloses an approach for increasing the surface coefficient of friction of high density polyethylene (HDPE) products by mechanically forming a rough surface texture on the thermoplastic material by embossing its surface as it is molded.

U.S. Pat. No. 4,693,507 discloses a method for increasing the coefficient of friction on an HDPE liner surface by applying a continuous film or layer of elastomeric material over the HDPE sheet. The elastomeric film layer can be applied to the HDPE sheet by lamination, by adhesive or application of heat.

U.S. Pat. Nos. 5,648,031 and 6,509,084 disclose preparation of a polyolefin, such as HDPE, ABS, PVC, PET. nylon, and PMMA, haying an anti-slip surface. The surface is composed of individual non-interconnected asperities of an anti-slip polymeric material that do not form a continuous film over the surface.

U.S. Pat. No. 5,645,912 discloses a method for making anti-skid/anti-slip staircase treads by affixing the tread to the stair nose with the use of a sealant and a detachable anti-skid/anti-slip conformable tape made out of aluminum. The flexible tape may have particulate matter securely attached to the upper surface for improved anti-skid traction.

U.S. Pat. No. 7,125,599 discloses methods for preparation of anti-slip surfaces around and near swimming pools that include: a) textured roughened rubberized surfaces that may include grooves: or b) a grit of sandpaper-like finish, where the finish is typically an adhesively attached sheet with the grit finish.

U.S. Pat. No. 3,676,198 discloses the application of granular bentonite material to a substrate by mixing it with a carbohydrate-based adhesive substrate.

U.S. Pat. No. 3,575,780 discloses the use of ground rubber or cork, bonded by PVC, acrylic resins or polyisobutylene using thermoplastic molding materials, such as a combination of bitumen with ethylene-butylacrylate copolymer, for coating the surface of a playing field.

U.S. Pat. No. 3,547,674 discloses the use of crumb rubber, which is compacted and oriented during preparation of a playing field surface.

U.S. Pat. No. 3,745,034 discloses the deposition of metallic powder on a metal strip by electrostatic technique using a gaseous aerosol.

U.S. Pat. No. 4,243,696 discloses a method for producing a particle-containing plastic coating on articles. The method comprises applying a mixture of powdered epoxy resin and a particulate material (alumina grit, silicon carbide grit, silica sand grit, glass particles, quartz grit or fiberglass) and curing the dry blend onto the surface by heating.

U.S. Pat. No. 4,336,293 discloses preparation of a plasticized PVC anti-slip mat covered by polyamide primer, which is spray coated with a polyurethane adhesive material containing alumina grit and then cured at 180° C.

U.S. Pat. No. 4,745,139 discloses surface coating formulations for application to surfaces that are in frequent contact with water for providing surface roughness and for increasing anti slip characteristics. The formulation comprises a styrene/ethylene/butylene/styrene block co-polymer, finely divided silicon dioxide filler, a solvent solution of methylmethacrylate copolymer solids, rubber tackifier and glass microspheres.

U.S. Pat. No. 5,494,729 discloses a non-slip coated substrate comprising a solid polysulfide film and a layer of rubber particles partially bonded to the film.

Nevertheless, a continuing need exists for a process to install water-resistant anti-slip articles on a surface that is at least partially covered with water.

SUMMARY OF THE INVENTION

In one embodiment, the current invention relates to a process comprising removing an adhesive-protecting film layer from a peel and stick multilayer article comprising an embossed, anti-slip thermoplastic layer selected from polyvinyl chloride, polypropylene, acrylonitrile butadiene styrene, polycarbonates or high density polyethylene: a water resistant adhesive layer; and the adhesive-protecting film layer, thereby exposing one side of the water-resistant adhesive layer; and then applying the exposed side of the water-resistant adhesive layer to a surface that is at least partially covered with water.

In another embodiment, the current invention relates to a peel and stick multilayer article comprising an embossed, anti-slip layer of polyvinyl chloride; a water-resistant adhesive layer; and an adhesive-protecting film layer.

BRIEF DESCRIPTION OF THE DRAWINGS

FIG. 2 is a diagram of a multilayer article where the adhesive protecting layer has been partially peeled away from the water resistant layer in preparation for applying it to a surface.

DETAILED DESCRIPTION OF THE INVENTION

Figure 1:
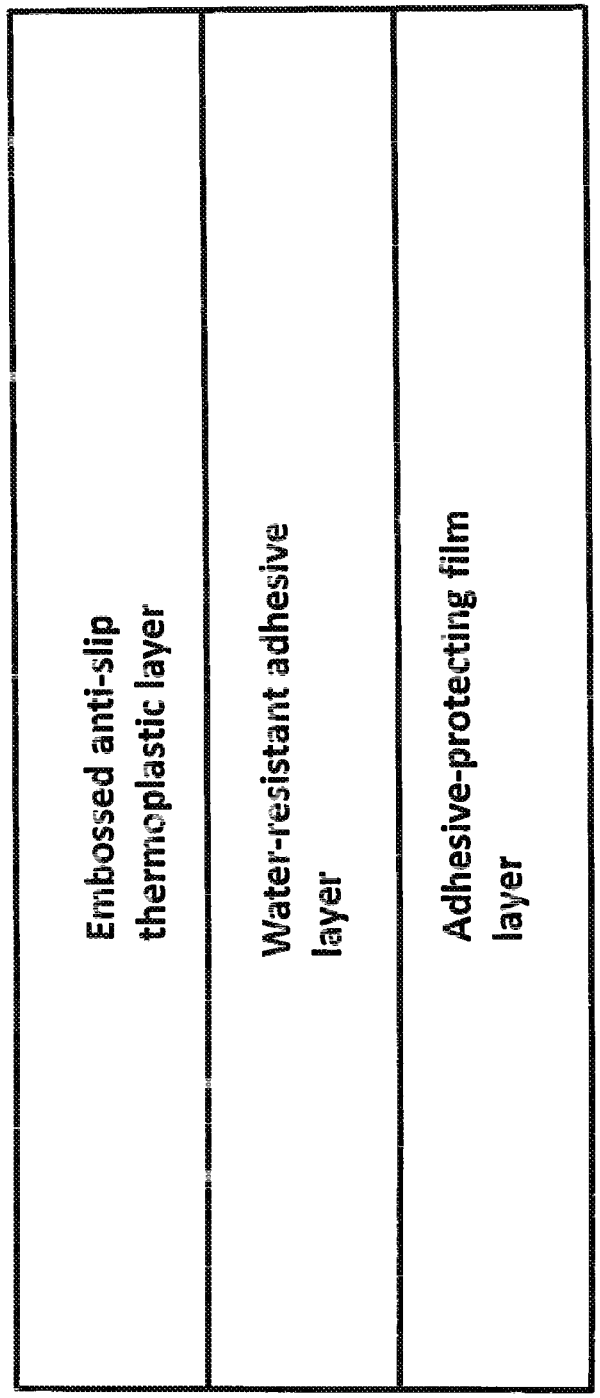
FIG. 1 is a diagram of a multilayer article.

The peel and stick multilayer article used in the claimed invention comprises an embossed, anti-slip thermoplastic layer, a water-resistant adhesive layer and an adhesive-protecting film layer, as shown in FIG. 1. The anti-slip thermoplastic layer is embossed on one side. On its other side the thermoplastic layer contacts the water-resistant adhesive layer. The water-resistant adhesive layer contacts the adhesive-protecting film layer on one side and the non-embossed side of the thermoplastic layer on its other side. The adhesive-protecting film layer contacts the water-resistant adhesive layer.

Embossed, Anti-Slip Thermoplastic Layer

The thermoplastic layer is preferably selected from polyvinyl chloride, polypropylene, acrylonitrile butadiene styrene, polycarbonates or high density polyethylene. Preferably, the thermoplastic layer is polyvinyl chloride. One side of the thermoplastic layer is embossed; the non-embossed side contacts the water-resistant adhesive layer.

The thermoplastic layer is embossed to provide an anti-slip characteristic. For the purposes of this specification, the term anti-slip means, with regard to a surface, the ability to reduce or prevent a smooth sliding motion of a person walking or running across the surface. The thermoplastic layer can be embossed by any method known to those skilled in the art provided that the embossing process results in anti-slip properties. For example, the thermoplastic layer may be processed between an engraved embossing roll and a chill or backup roll. The embossing roll can be heated or chilled, depending on the particular process configuration; e.g., the embossing roll can be heated to soften the thermoplastic, or chilled if heated rollers precede the embossing step.

Water-Resistant Adhesive layer

The peel and stick multilayer article also comprises a water-resistant adhesive layer comprising a solvent-based pressure sensitive adhesive. One side of this layer contacts the thermoplastic layer on its non-embossed side. The other side contacts the adhesive-protecting film layer. Upon installation of the multilayer article, the adhesive-protecting film is removed and the newly-bare adhesive layer is applied to a surface. The adhesive layer must have sufficient adhesive strength to maintain contact with the surface after application under the stress of normal use. However, the adhesive strength should not be so high that upon removal the surface is damaged, as would be the case with contact adhesives such as polychloroprene, which typically have strong bonds and high shear resistance.

The adhesive layer is water-resistant, since the multilayer article is installed on a surface that is at least partially covered with water. An adhesive suitable as the water-resistant adhesive layer is 300LSE, commercially available from 3M™.

Adhesives that aren't water resistant are not suitable. Preferably, the adhesive is an acrylic-based adhesive. More preferably, the adhesive is a solvent borne acrylic-based adhesive. Similarly, because the multilayer article may be applied to surfaces in confined spaces, ease of use is desirable. Thus, multi-component adhesives, i.e., adhesives that contain several components which are not adhesives individually, but only become so after mixing, would not be suitable for the peel and stick multilayer article. Finally, adhesives which can prove difficult to work with mechanically, such as epoxy-based materials, and adhesives requiring hardening via chemical reaction with an external energy source such as radiation, heat, and moisture, are also not suitable.

Adhesive-Protecting Film Layer

The peel and stick multilayer article also comprises an adhesive-protecting film layer. This layer prevents the adhesive from prematurely contacting a surface, or from contamination with dust, dirt or other undesirable materials. The adhesive-protecting film layer contacts, on one side, the water-resistant adhesive layer.

The protecting film layer should have a level of adhesion with the adhesive layer such that it would not be easily removed inadvertently with light contact, but can be peeled off without undue effort. Preferably, the adhesive-protecting film layer is paper.

In one embodiment, the current invention relates to a process comprising removing an adhesive-protecting film layer from a peel and stick multilayer article comprising an embossed, anti-slip thermoplastic layer selected from polyvinyl chloride, polypropylene, acrylonitrile butadiene styrene, polycarbonates or high density polyethylene; a water-resistant adhesive layer; and an adhesive-protecting film, thereby exposing one side of the water-resistant adhesive layer; and then applying the exposed side of the water-resistant adhesive layer to a surface that is at least partially covered with water. In this process, the peel and stick multilayer article is as described above.

Preferably, the surface is that of an in-ground or above-ground pool, spa, shower, bathtub or boat. The surface can also be those areas adjacent to the in-ground or above-ground pool, spa, shower or bathtub. More preferably, the surface is an in-ground or above ground pool, or the area around it.

When the peel and stick multilayer article is ready to be applied to a surface, the adhesive-protecting film layer is removed to expose the adhesive layer, as shown in FIG. 2. When the peel and stick multilayer article is applied so as to contact the exposed side of the adhesive layer with the intended surface. One skilled in the art would understand that the applied multilayer article could then be rolled or pressed to further enhance adhesion or appearance.

Preferably, the peel and stick multilayer article is applied to a surface of polyvinyl chloride, reinforced polyester, granite, or concrete that is at least partially covered with water. More preferably, the surface is completely covered with water. Preferably, the peel and stick multilayer article is applied to the surface of a swimming pool, such as on steps within the pool or the pool bottom at the shallow section. This advantageously permits installation of the anti-slip articles without emptying the pool of water. More preferably, the peel and stick multilayer article is applied to a surface of the swimming pool that is completely covered with water.

While it is possible that the adhesive-protecting film layer can either be removed above water, or while partially covered with water, and then subsequently applied to a surface of the pool that is partially or completely submerged in water, it is preferred that the removal of the adhesive-protecting film layer be under water. More preferably, both the removal of the adhesive-protecting film layer and the application of the peel and stick multilayer article to the surface of the swimming pool is performed under water.

In another embodiment, the current invention relates to a peel and stick multilayer article comprising an embossed, anti-slip layer of polyvinyl chloride; a water-resistant adhesive layer; and an adhesive-protecting film layer. The peel and stick multilayer article is as described above.

The following Examples further detail preparation of the inventive peel and stick multilayer article. These examples merely illustrate the invention. Those skilled in the art will recognize many variations that are within the spirit of the invention and scope of the claims.

EXAMPLES

Example 1

A peel and stick multilayer article was prepared by applying one side of a water-resistant two-sided acrylic adhesive tape, commercially available from 3M™ 300LSE, to an embossed layer of polyvinyl chloride. A paper adhesive-protecting film layer was part of the non-applied side of the acrylic adhesive tape. A one foot square section of the peel and stick multilayer article was adhered to an underwater surface of flexible polyvinyl chloride pool liner by peeling the adhesive-protecting paper film layer from the multilayer article and pressing the multilayer article onto an underwater surface. After four months, the section of peel and stick multilayer article remained attached to the underwater surface. The multilayer article was then peeled from the surface with no deterioration of the surface. Finally, the sample was then re-adhered to the surface.

Example 2

A peel and stick multilayer article was prepared as in Example 1 except that a twenty toot by one foot section was fabricated and then rolled, prior to installation. The multilayer article was applied to the top step of a flexible polyvinyl chloride pool liner by peeling back the adhesive-protecting paper film layer along a length of a two foot portion and pressing the exposed section of the adhesive layer to the step. The remainder of the multilayer article was installed by pulling off the paper adhesive-protecting film layer as the multilayer article was unrolled onto the underwater step. The multilayer article demonstrated good levels of adhesion to the step.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

We claim:

1. A process comprising:
    removing an adhesive-protecting film layer from a peel and stick multilayer article comprising:
        an embossed, anti-slip thermoplastic layer selected from polyvinyl chloride, polypropylene, acrylonitrile butadiene styrene, polycarbonates or high density polyethylene;
        a water-resistant adhesive layer, wherein the adhesive is acrylic-based and is not hardened from chemical reaction with an external energy source selected from radiation or heat; and
        the adhesive-protecting film layer, thereby exposing one side of the water-resistant adhesive layer; and
    applying the exposed side of the water-resistant adhesive layer to a surface that is at least partially covered with water.

2. The process of claim 1 wherein the anti-slip thermoplastic layer is polyvinyl chloride.

3. The process of claim 1 wherein the adhesive-protecting film layer is paper.

4. The process of claim 1 wherein the surface is completely covered with water.

5. The process of claim 4 wherein the adhesive-protecting film layer is removed above water.

6. The process of claim 4 wherein the adhesive-protecting film layer is removed under water.

7. A process comprising:
    removing an adhesive-protecting film layer from a peel and stick multilayer article under water, the peel and stick multilayer article comprising:
        an embossed, anti-slip thermoplastic layer selected from polyvinyl chloride, polypropylene, acrylonitrile butadiene styrene, polycarbonates or high density polyethylene;
        a water-resistant adhesive layer, wherein the adhesive is acrylic-based and is not hardened from chemical reaction with an external energy source selected from radiation or heat; and
        the adhesive-protecting film layer, thereby exposing one side of the water-resistant adhesive layer; and
    applying the exposed side of the water-resistant adhesive layer to a pool surface that is under water.

8. A process comprising:
    removing an adhesive-protecting paper film layer from a peel and stick multilayer article under water, the peel and stick multilayer article comprising:
        an embossed, anti-slip polyvinyl chloride layer;
        a water-resistant adhesive layer, wherein the adhesive is acrylic-based and is not hardened from chemical reaction with an external energy source selected from radiation or heat; and
        the adhesive-protecting film layer, thereby exposing one side of the water-resistant adhesive layer; and
    applying the exposed side of the water-resistant adhesive layer to a pool surface that is under water.

\* \* \* \* \*